United States Patent
Nagai

[11] Patent Number: 5,835,989
[45] Date of Patent: Nov. 10, 1998

[54] BATTERY SYSTEM WHICH PREVENTS CURRENT FROM FLOWING DURING A SHORT-CIRCUITING OF THE BATTERY TERMINALS

[75] Inventor: Shinji Nagai, Kanagawa, Japan

[73] Assignee: Ricoh Co., Ltd., Tokyo, Japan

[21] Appl. No.: 392,331

[22] Filed: Feb. 22, 1995

[30] Foreign Application Priority Data

Feb. 24, 1994 [JP] Japan .................................... 6-026716
Mar. 30, 1994 [JP] Japan .................................... 6-059668
Nov. 11, 1994 [JP] Japan .................................... 6-278168

[51] Int. Cl.$^6$ ............................... H01H 35/00; H02J 7/00
[52] U.S. Cl. ......................... 307/116; 307/150; 320/112; 320/116; 361/18; 361/82
[58] Field of Search ..................... 307/112, 113, 307/115, 116, 127, 150, 43, 85, 86, 125; 361/82, 84, 18; 320/13, 14, 49, 40, 30, 34, 36, 112, 114, 127, 110

[56] References Cited

U.S. PATENT DOCUMENTS

| | | | |
|---|---|---|---|
| 3,686,530 | 8/1972 | Bogut | 320/40 |
| 4,578,628 | 3/1986 | Siwiak | 320/2 |
| 4,673,826 | 6/1987 | Masson | 307/66 |
| 4,857,985 | 8/1989 | Miller | 361/82 |
| 5,363,030 | 11/1994 | Ford et al. | 320/13 |
| 5,410,441 | 4/1995 | Allman | 361/18 |
| 5,471,128 | 11/1995 | Patino et al. | 320/13 |
| 5,477,130 | 12/1995 | Hashimoto et al. | 320/49 |
| 5,493,197 | 2/1996 | Eguchi et al. | 320/5 |

FOREIGN PATENT DOCUMENTS 4-162348 6/1992 Japan .
6-215744 8/1994 Japan .

OTHER PUBLICATIONS

Hitachi Power MOS FET Data Book, 5th Ed., Jul. 1992, pp. 41–43.

*Primary Examiner*—Jeffrey A. Gaffin
*Assistant Examiner*—Jonathan S. Kaplan
*Attorney, Agent, or Firm*—Oblon, Spivak, McClelland, Maier & Neustadt, P.C.

[57] ABSTRACT

A rechargeable battery package includes circuitry with a switching device which disconnects the exterior terminals of the battery package from one or more batteries therein. The circuit also includes a device having a diode function which allows the battery or batteries to be charged regardless of the state of the switching device. A power MOS-FET having a diode characteristic is used for the switching device and diode device. The gate of the power MOS-FET controls the disconnections of the batteries within the battery package. The gate is connected to a switch such as a reed relay contained within the battery package which is triggered by a magnet within a portable computer. Alternatively, a control terminal may be provided on the exterior of the battery package which is connected to the gate of the power MOS-FET.

15 Claims, 6 Drawing Sheets

| CONTROL TERMINAL VOLTAGE LEVEL | | OPERATION MODE OF THE BATTERY | |
|---|---|---|---|
| TERMINAL 19a | TERMINAL 19b | BATERY 6a | BATTERY 6b |
| LOW | LOW | CHARGING AND DISCHARGING | CHARGING AND DISCHARGING |
| LOW | HIGH | CHARGING AND DISCHARGING | CHARGING ONLY |
| HIGH | LOW | CHARGING ONLY | CHARGING AND DISCHARGING |
| HIGH | HIGH | CHARGING ONLY | CHARGING ONLY |

BATTERY SYSTEM WHICH PREVENTS CURRENT FROM FLOWING DURING A SHORT-CIRCUITING OF THE BATTERY TERMINALS

BACKGROUND OF THE INVENTION

1. Field of the Invention

This invention relates to the field of batteries and in particular, rechargeable batteries used in portable electric devices such as personal computers (PCs). The invention further relates to a rechargeable battery containing circuitry which prevents current from flowing during a short-circuiting of the battery terminals.

2. Description of the Related Art

Portable electric devices such as a notebook or laptop styled PC are becoming popular. Generally, the portable electric device is powered by AC power in the desktop environment, and powered by a rechargeable battery in the mobile environment. According to a progression of processing ability of portable computers including a high performance microprocessor or a high fidelity display device, consumption of electricity in the portable computer increases. Therefore, portable computers use a high capacity rechargeable battery which includes NiCd (nickel-cadmium) batteries, or NiMH (nickel-metal Hydride) batteries.

In the operation of the portable computer or another portable electric device, it is important to provide sufficient electric power from the battery. For this object, there are functions within the portable computer itself for reducing consumption of electric power. For example, a back-light intensity of an LCD (Liquid Crystal Display) can be reduced, the computer can be put in a sleep mode which saves electricity consumed by the processing unit, a low electric power HDD (Hard Disk Drive) may be used, and so on. However, even with these power saving features, a high capacity rechargeable battery is still needed for long operation of the portable computer.

Generally, rechargeable battery packages used in portable computers and the like have only one set of terminals for supplying relatively large electric current and for recharging the battery therein. Sometimes, the battery cannot be charging and supplying electric power at the same time. Therefore, to provide sufficient charge over an adequate period of time, it is necessary to supply a large electric current from the battery charger to the battery. As a result, the battery charger becomes larger and heavier, and reduces flexibility of the system.

Furthermore, the terminals of the battery are usually exposed. Because these terminals are constantly supplied with electricity, it is possible to have a short-circuit of the battery terminals when the battery is removed from the portable computer.

A conventional device for preventing short-circuiting of battery terminals is disclosed in Japanese Laid-Open Patent Application No. 4-162348 (1992). This publication discloses a detachable insulator for covering the terminals of the battery package. However, this type of device is inconvenient and easy to lose.

Due to the increase in use of rechargeable batteries and portable computers, it is more important to control a status of the battery terminals in order to save electric power consumption and to prevent short-circuiting of the battery terminals.

SUMMARY OF THE INVENTION

Accordingly, one object of this invention is to provide a novel and efficient apparatus for a battery such as a rechargeable battery device in order to control charging and discharging of the battery. Another object of this invention is to provide a rechargeable battery package to prevent a short-circuit of the battery terminals. A further object of this invention is to provide a system which enables a portable computer to operate for a longer period of time based on the control of the battery device. A further object of this invention is to design the battery to be able to use a conventional battery charger.

According to the invention, a circuit including a power MOS-FET having a diode characteristic is used to prevent a short-circuit of the battery terminals unless a specific signal is applied to the gate of the power MOS-FET. However, due to the diode characteristic of the power MOS-FET, it is possible to charge the battery, regardless of the signal applied to the gate. The signals applied to the gate may be due to physically placing the battery in the portable computer or may be due to a signal sent from the portable computer. In one embodiment, a magnet in the computer triggers a switch or relay in the battery so that the desired signal is sent to the gate.

In an alternative embodiment, a control terminal controls the power MOS-FET for the rechargeable battery package which enables control of electric power from the rechargeable battery. In this embodiment, there are a plurality of batteries within the battery package which supply power from different elements of the computer. The invention allows the computer to selectively disconnect different batteries so that power is cut off to different parts of the computer, depending on the desired power savings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
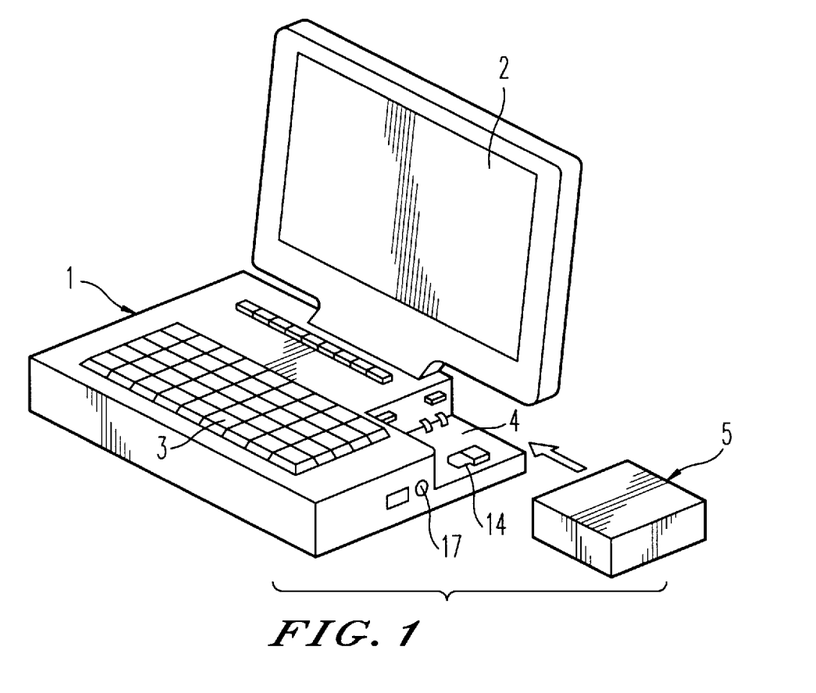
FIG. 1 is a perspective view of a portable computer and a battery.

Referring now to the drawings, wherein like reference numerals designate identical or corresponding parts throughout the several views, and more particularly to FIG. 1 thereof, there is illustrated a portable computer 1 and battery 5 for connection with the portable computer. The portable computer 1, such as a word processor or personal computer, includes a display 2 such as an LCD, a keyboard 3, a battery storage section 4 for holding a battery package 5 which supplies electric power to the portable computer 1. A magnet 14 is provided on the surface of the battery storage portion 4 which acts on a switch or relay contained within the battery package 5.

Figure 2:
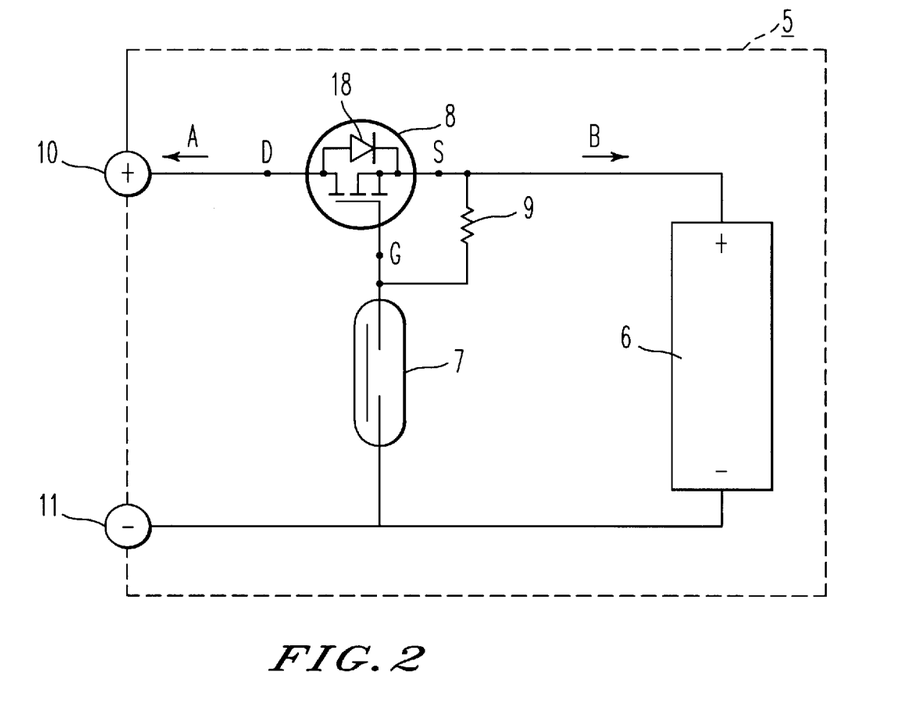
FIG. 2 is a circuit diagram of the first embodiment of the invention incorporating a P-channel power MOS-FET.

FIG. 2 illustrates a circuit diagram of the battery package 5. Within the battery package 5, there is a battery 6 which will usually be a rechargeable battery such as a NiCd battery or a NiMH battery. There is a positive terminal 10 and a negative terminal 11 on the surface of the battery package 5. These terminals are exposed to the outside of the battery package.

A P-channel power MOS-FET 8 is used to control the connection of the positive terminal 10 to the battery. An example of this MOS-FET is an enhancement type (normally-off) power MOS-FET such as a P-channel vertical construction power MOS-FET having a parasite diode characteristic commercially available from Hitachi, Model No. 2SJ220. A description and semiconductor structure illustration of such a MOS-FET is disclosed in Hitachi Power MOS FET Data Book, 1992, Fifth Edition, pp 41–43, which is incorporated herein by reference. The enhancement type power MOS-FET does not conduct drain current when an electric voltage of the gate is equal to 0V. A feature of the power MOS-FET employed by the present invention is the parasitic diode characteristic illustrated as diode 18 in FIG. 2. This characteristic of the power MOS-FET 8 allows the battery to be charged, regardless of the signal applied to the gate G of the power MOS-FET.

The features of the power MOS-FET include superior frequency and switching characteristics which give a high speed response. Because the power MOS-FET is a voltage control device, it is controlled using low electric current applied to the gate. There is no concentration of electric power in the device which makes it hard to burn up and enables a large electric current to be transferred through the device. The power MOS-FET 8 includes a drain electrode (D) which is connected to the positive terminal 10. There is a source electrode (S) connected to the positive electrode of the rechargeable battery 6. A gate electrode (G) of the MOS-FET 8 is connected to a terminal of a reed relay 7 also referred to as a reed switch. The reed relay 7 is a type of magnetic sensor which detects the setting status of the battery package 5. When the battery package 5 is placed over the magnet 14 illustrated in FIG. 1, the reed relay 7 closes. The reed relay 7 serves as a switch between the ground terminal of the battery 6 and the gate G of the power MOS-FET 8. Of course, other switches may be substituted in place of the reed relay 7 such as a different type of magnetically activated switch, or a mechanical switch which engages with a part of the battery storage portion 4 of the portable computer. Further, other types of switches may be used as long as the switch is closed when the battery package is inserted into the computer.

There is a resistor 9 connected between the gate electrode G and the source electrode S so that the potential between G and S is different when current is flowing through the resistor 9 such as when the reed relay 7 is closed.

This voltage difference between the gate and source allows current to flow from the positive terminal. When the battery package is detached from the portable computer, the reed relay 7 is open because a magnetic field is not present. Therefore, the electric potential of the source S and the gate G become equal to each other and there is no flow of current from the source S to the drain D based on the switching characteristics of the MOS-FET 8. Therefore, even if the positive terminal 10 and the negative terminal 11 are short-circuited when the battery package 5 is detached from the portable computer 1, there is no discharging of electric current from the drain electrode D to the positive terminal 10 (direction A in FIG. 2).

However, even when the battery package 5 is detached from the portable computer 1, the parasitic diode 18 which is not necessarily a separate element but included within the MOS-FET 8 allows the MOS-FET 8 to conduct current from the drain electrode D to the source electrode S (direction B in FIG. 1), regardless of the electric potential of the gate electrode G. Therefore, a special magnet such as magnet 14 does not need to be placed in the battery charger in order to charge the battery which allows a conventional battery charger to be used for charging the battery 6.

Figure 3:
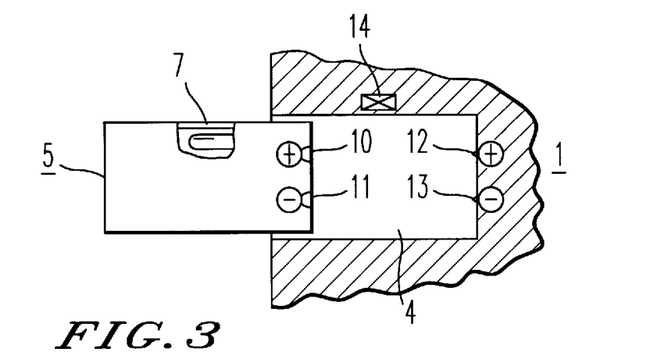
FIG. 3 illustrates the battery being inserted into the portable computer.
Figure 4:
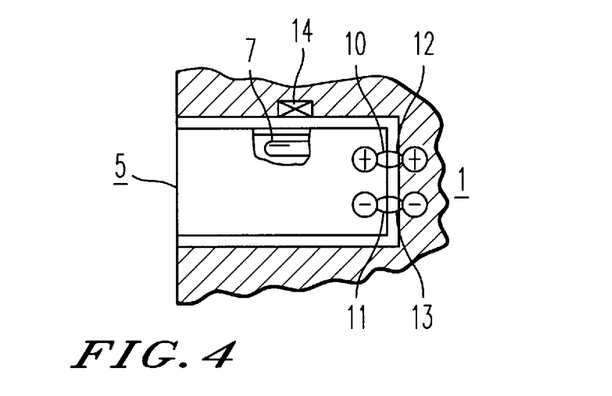
FIG. 4 illustrates the battery fully inserted into the portable computer.

FIGS. 3 and 4 illustrate the battery package 5 as it is inserted into the battery storage portion 4 of the portable computer 1. In FIG. 3, the reed relay 7 is open and does not detect the battery package 5 completely inserted into the battery storage portion 4. In FIG. 4, the reed relay 7 is closed due to the magnetic field from the magnet 14. When the battery package 5 is inserted into the battery storage portion 4, the positive and negative terminals 10 and 11 respectively of the battery package 5 engage with the positive and negative terminals 12 and 13 respectively of the portable computer. In the above-described embodiment, the use of a magnetic field is employed so that the battery can be discharged through the MOS-FET 8. The use of the magnetic reduces friction of the sliding of the battery package 5 into place and allows a reliable detection of the insertion of the battery package 5 into the portable computer 1. However, alternatives to the use of a magnetic field such as a mechanical switch or light sensing switch may be used in the alternative.

Figure 5:
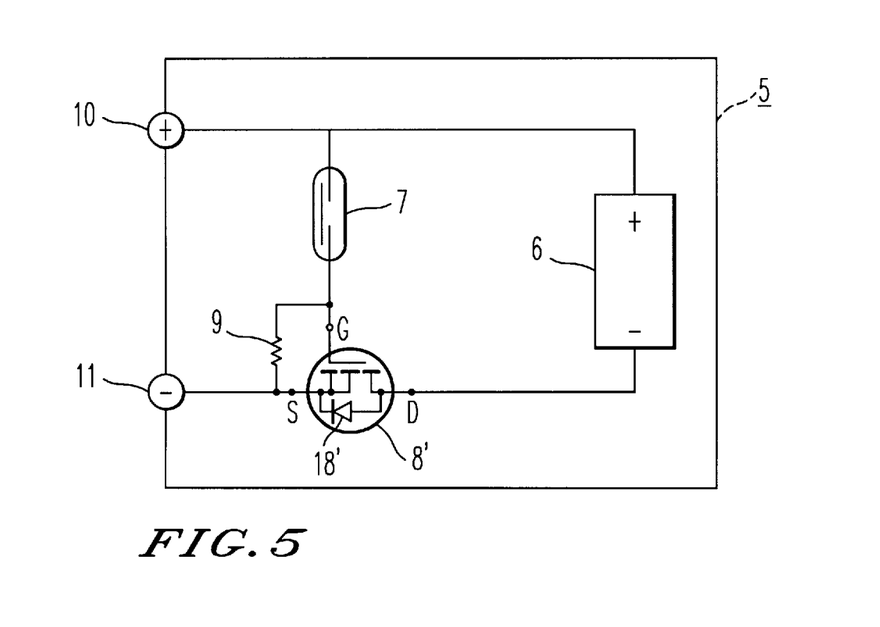
FIG. 5 is a circuit diagram of the first embodiment of the invention implemented using an N-channel power MOS-FET.

As an alternative to the use of a P-channel power MOS-FET 8, it is also possible to use an N-channel power MOS-FET to control the electric potential of the battery terminals as illustrated in FIG. 5. FIG. 5 is a circuit diagram similar to FIG. 1 which employs an N-channel power MOS-FET 8' instead of the P-channel power MOS-FET 8 illustrated in FIG. 2. The N-channel power MOS-FET 8' is connected to the negative terminal of the battery 6. The embodiment illustrated in FIG. 5 operates in a manner similar to the operation of the embodiment illustrated in FIG. 2 except for the terminal which is being disconnected from the battery 6. However, disconnection of either terminal from a battery is equally effective and therefore, the two embodiments are equivalent. Note that in FIG. 5, the parasitic diode 18' operates in a manner similar to the parasitic diode 18 in the P-channel power MOS-FET and allows the battery 6 to be charged regardless of the state of the reed relay 7 but only permits current to be drawn through terminals 10 and 11 when the reed relay 7 is closed.

Figure 6:
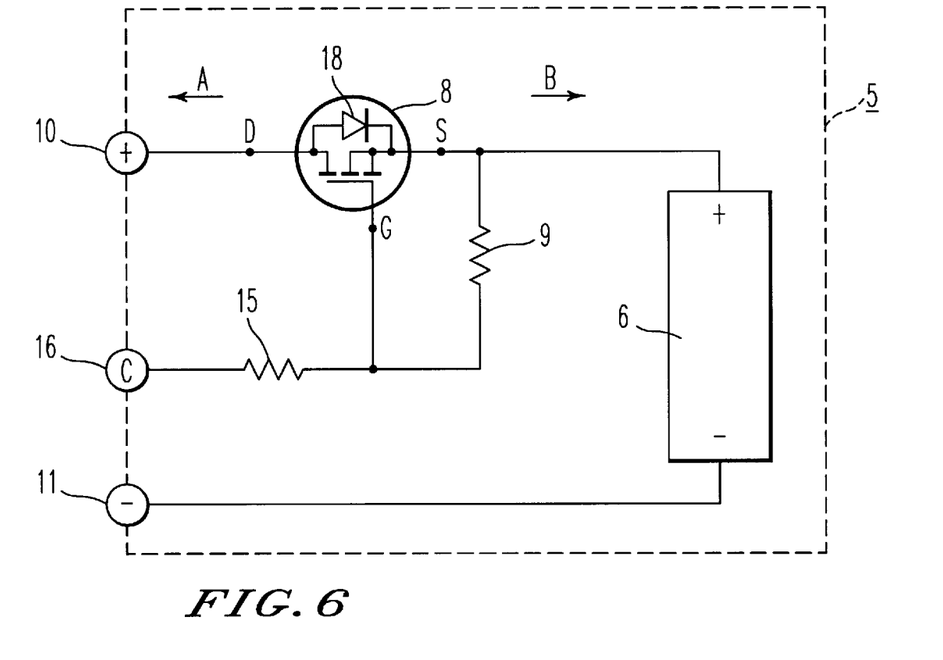
FIG. 6 is a circuit diagram of the first embodiment of the invention in which a control terminal is used to control the gate of the power MOS-FET.

FIG. 6 illustrates an alternative embodiment of the invention which does not use a reed relay 7 or other type of mechanical switch to control the power MOS-FET 8 but uses a control terminal 16 which is connected to the gate electrode G of the power MOS-FET 18 through a resistor 15. In this embodiment, before the battery package 5 is set into the battery storage portion 4, the electric potential of the source electrode S and the gate electrode G are equal to each other. Therefore, the power MOS-FET 8 will conduct only in direction B in order to charge the battery 6. In this embodiment, even if there is a short-circuit between the terminals 10 and 11, there will be no flow of current from the source electrode S to the drain electrode D.

When a negative potential is applied to the control terminal 16, the power MOS-FET 8 allows current to flow in the direction A. The use of the control terminal 16 allows the application of the proper potential to the gate electrode G in a similar manner as the reed relay 7 applies a potential to the gate electrode G in the embodiment illustrated in FIGS. 2 and 5. This embodiment eliminates the need for the magnet 14 in the battery storage portion 4.

If relatively large resistances are used for the resistors 9 and 15, the control terminal 16 only needs to provide a small amount of current. This would reduce the risk of electric shock should control terminal 16 be short-circuited with one of the other terminals. When the output voltage of the battery package 5 is 7.2 volts, the resistor R9 could be set equal to 100K and the resistor R15 could be set equal to 10K.

Figure 7:
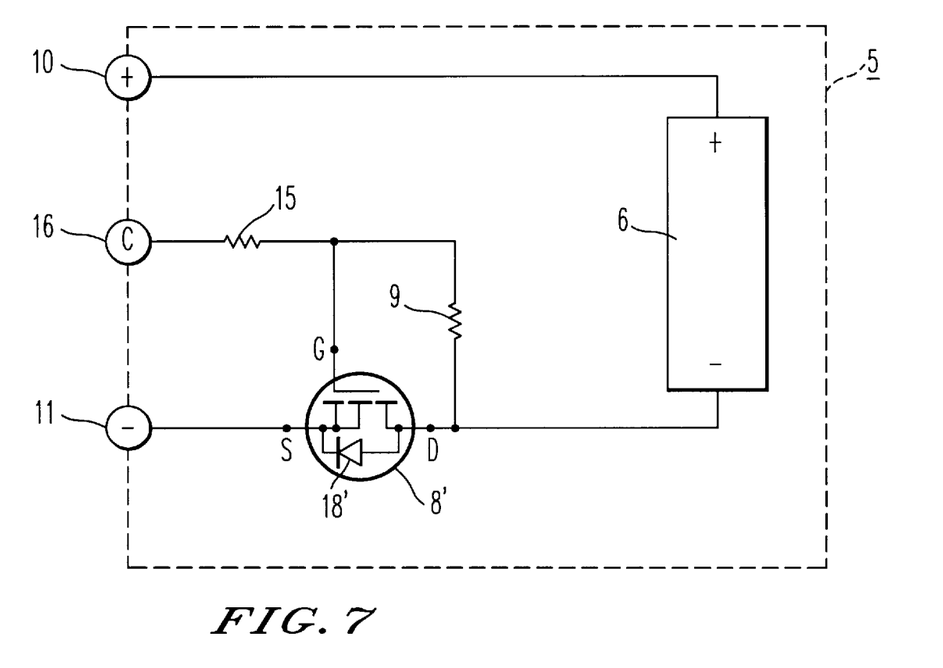
FIG. 7 is a circuit diagram similar to FIG. 6 which is implemented using an N-channel power MOS-FET.

The circuit diagram of FIG. 7 is similar to the circuit diagram of FIG. 6 but employs an N-channel power MOS-FET 18' and operates in a similar manner to the circuit of FIG. 6 and accordingly, a description thereof will be omitted for the sake of brevity.

Figure 8:
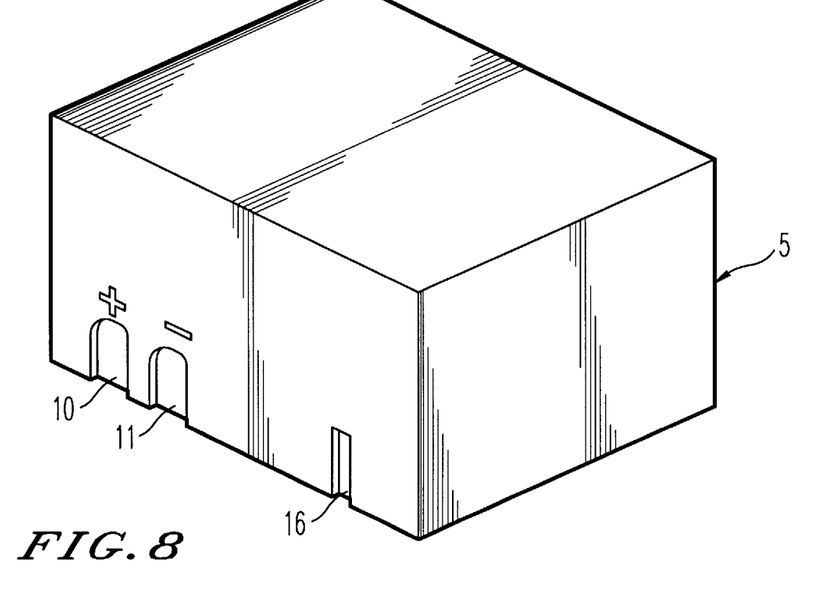
FIG. 8 illustrates a rechargeable battery including a control terminal.
Figure 9:
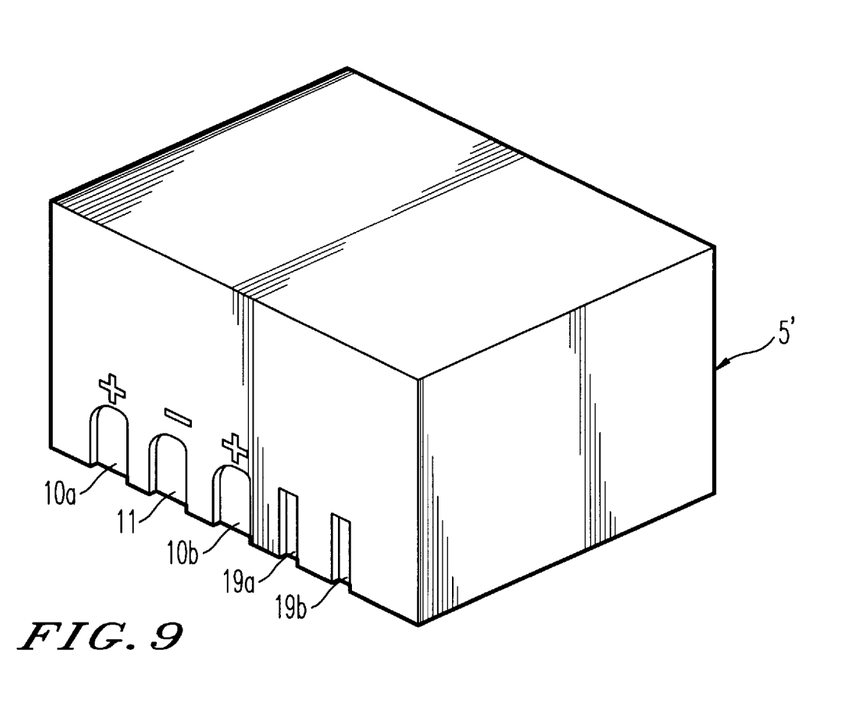
FIG. 9 illustrates a battery package used by the second embodiment of the invention including two batteries and two control terminals.

FIG. 8 illustrates the battery package 5 used with the embodiments of FIGS. 6 and 7. In order to reduce the risk of contact or short-circuit with the control terminal 16, the control terminal 16 may be made smaller or narrower than the terminals 10 and 11 and may have a slit shape as illustrated in FIG. 8.

A feature of the embodiment illustrated in FIGS. 6–8 is that it is possible to electrically disconnect the battery package 5 from the portable computer 1, even when the battery is contained within the battery storage portion 4. This is simply done by removing the signal applied to the control terminal 16 and may be desirable when an AC power source is connected to the portable computer 1.

FIGS. 9–12 pertain to a second embodiment of the invention which overcomes the following problems. Generally, rechargeable battery packages contain only one battery. Therefore, this battery will have a large capacity in order to enable a longer operation of a portable electric device such as a portable computer. The larger the single battery device, the longer the charging time for such a battery. Further, the single battery device does not permit the simultaneous charging and use (discharging) of the battery.

Figure 10:
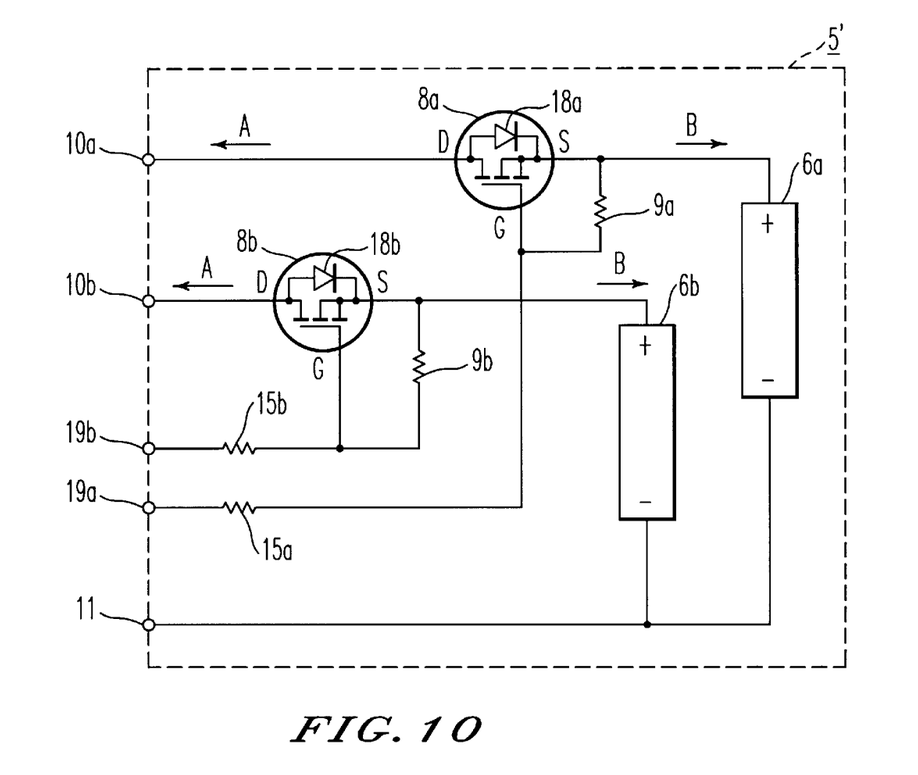
FIG. 10 illustrates a circuit diagram of the second embodiment of the invention.

The second embodiment of the invention, illustrated in FIGS. 9–12 include a plurality of rechargeable batteries 6x within the battery package 5'. For each battery 6x within the battery package 5', there is a corresponding control terminal 19x. For example, the battery package 5' in FIGS. 9 and 10 includes a positive terminal 10a and corresponding control terminal 19a and a second positive terminal 10b and corresponding control terminal 19b. A description of the operation and elements of FIG. 10 is omitted as these elements correspond to and operate in an analogous manner to the circuitry illustrated in FIG. 6. However, in FIG. 10, only one ground terminal 11 is necessary as the plurality of batteries 6 can share the same ground terminal. A circuit similar to FIG. 10 can be constructed using N-type power MOS-FETs in a similar manner as illustrated in FIG. 7.

Figure 11:
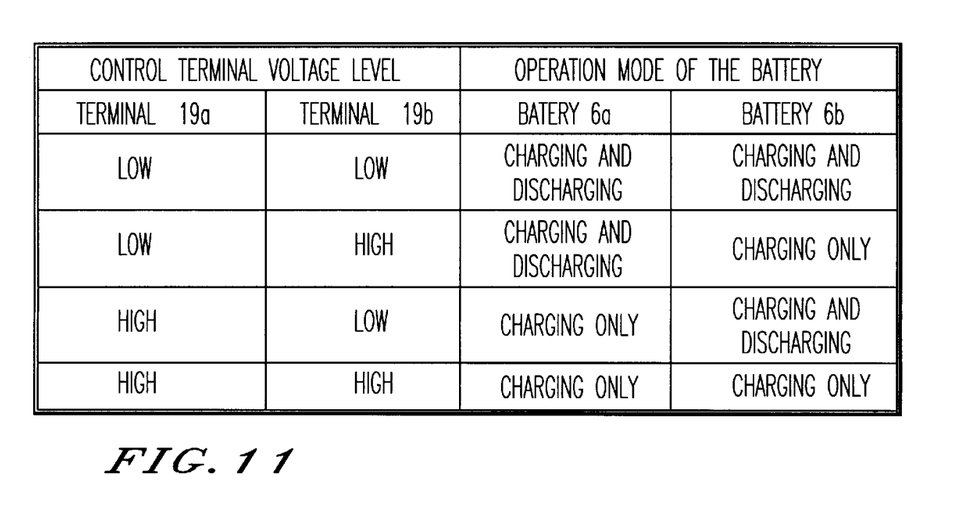
FIG. 11 illustrates a table showing relationships between control terminals and the operation modes of the batteries.

FIG. 11 illustrates a table showing the relationship between the status of the operation mode of the two batteries 6a and 6b depending on the signals applied to the control terminals 19a and 19b. These control terminals 19a and 19b control the discharging of the battery and do not affect the charging capability. In FIG. 11, the signal "Low" is the same potential as the negative terminal of the batteries and therefore, the power MOS-FET would be activated and allow current to flow from the source to the drawn or the drain to the source and the battery could be charged or used to supply power (discharged). "High" means that the electric potential of the discharge terminal is at the same potential as the positive terminal of the battery which is equivalent to not applying any signal to the control terminal. In this case, the power MOS-FET is off and current cannot be supplied to the positive terminal.

Figure 12:
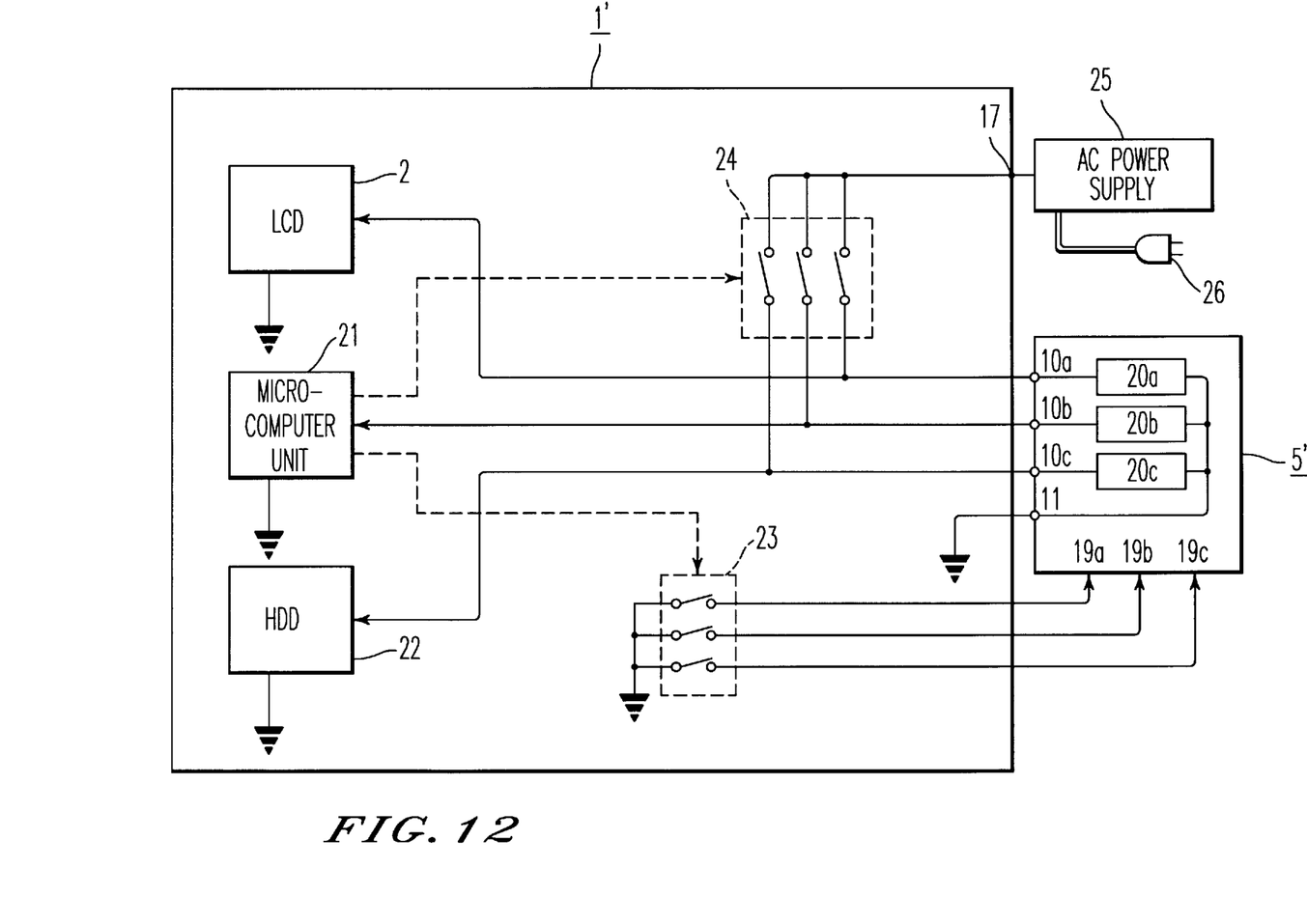
FIG. 12 illustrates a hardware block diagram of a portable computer, AC power supply and battery according to the second embodiment of the invention.

FIG. 12 shows a hardware block diagram of a portable computer 1' which controls the connection of the batteries. The battery package 5" includes three battery systems 20a, 20b and 20c which each include rechargeable batteries and power MOS-FETs. The structure of the battery systems 20a, 20b, and 20c corresponds to the structure illustrated in FIG. 6 or one of the battery systems illustrated in FIG. 10.

Terminal 10a supplies power to a liquid crystal display 2, terminal 10b supplies power to a microcomputer unit 21 which includes a CPU, ROM, RAM and terminal 10c supplies power to a hard disk drive 22. The microcomputer unit 21 controls the connection of an AC power supply 25 which includes a plug 26 through a connection 17 on the microcomputer 1' through a switch 24. The switch 23 includes three switches which control whether or not power is supplied from the battery systems 20a, 20b, and 20c. In the portable computer 1', the consumption of electric power of the LCD 2, the microcomputer unit 21 and the HDD 22 have different characteristics. The LCD 2 includes a backlight which consumes a large amount of electric power. This light could be turned off after a predetermined period of inactivity in order to reduce electric power consumption. The CPU can be placed in a sleep mode which does not include heavy processing although the RAM therein needs electric current for refreshment of storage data at all times. The HDD 22 uses a relatively large amount of electric current in a disk access state but consumes low electric power other than in the disk access state. The disk connection or reduction in power to the LCD 2, microcomputer unit 21, and HDD 22 are carried out according to known power control methods including inactivity after a predetermined period of time. These power control methods are currently employed by most portable computers.

Through the use of the three switches within the switch 24, the microcomputer unit 21 can charge the batteries using the AC power supply 25, even during operation of the portable computer. For example, if the hard disk drive 22 is not being used, the battery 20c thereof may be charged. It may also be possible to charge the battery under any circumstances as the computer is being used.

In the embodiment illustrated in FIG. 12, it is possible to store the history of the use of the different batteries. A control program is executed by the microcomputer unit 21 and includes information indicating the number of batteries within the system, the electric capacity of the batteries, the history of the life of the rechargeable batteries, the charging period of the battery system, a natural discharging coefficient, a frequency of charging, and any other desired parameters pertaining to the battery system. With this information, the control program can efficiently control the rechargeable battery package 5". For example, the program could be used to prevent overcharging or overdischarging of the rechargeable battery device. The control program can be further used to predict the lifespan of each battery device based on the history of the recharging.

Obviously, numerous modifications and variations of the present invention are possible in light of the above teachings. It is therefore to be understood that within the scope of the appended claims, the invention may be practiced otherwise than as specifically described herein. For example, it is possible to replace the power MOS-FETs with a bipolar transistor and a diode to construct a circuit which is equivalent to the power MOS-FET. Also, it is simple to modify the capacity of each rechargeable battery based on the corresponding element within the portable computer so that elements which consume more electric power than others have a larger capacity battery. This invention is also applicable to other battery powered devices besides portable computers such as portable and cellular phones.

What is claimed as new and is desired to be secured by Letters Patent of the United States is:

1. An apparatus comprising:
    a battery including first and second terminals;
    a current switch including:
        a first terminal connected to the first terminal of the battery,
        a second terminal for supplying power to a device, and
        a control terminal which controls a state of the current switch,
        said current switch transmitting current between the first terminal and the second terminal in order for the battery to be discharged only when a conducting signal is applied to said control terminal of said current switch;
    a magnet activated switch;
    a battery pack housing which includes therein the battery, the magnet activated switch, and the current switch;
    a first battery pack terminal, connected to the second terminal of the current switch, exposed to an exterior of the battery pack housing; and
    a second battery pack terminal, connected to the second terminal of the battery, exposed to the exterior of the battery pack housing,
    wherein the first battery pack terminal and the second battery pack terminal are both for supplying current to a device external to the battery pack housing from the battery and also for charging the battery,
    the apparatus further comprising:
        a diode connected across the first terminal and the second terminal of the current switch which allows current to flow between the first terminal and the second terminal in order to charge the battery pack regardless of the state of the switch,
        wherein during a normal operation said conducting signal is supplied through the magnet activated switch to the control terminal when the battery pack housing is installed in a device including a magnet used to activate the magnet activated switch, and said conducting signal is not supplied to the control terminal when said magnet activated switch is not activated and the battery pack housing is not installed.

2. An apparatus according to claim 1, wherein said battery is a rechargeable battery.

3. An apparatus according to claim 1, wherein said battery is selected from a group, consisting of a NiCd battery and a NiMH battery.

4. An apparatus according to claim 1, wherein:
   said current switch is a power MOS-FET; and
   said control terminal of the current switch is a gate terminal of the power MOS-FET.

5. An apparatus according to claim 1, wherein:
   said current switch is a power MOS-FET;
   said control terminal of the current switch is a gate terminal of the power MOS-FET; and said diode is included within the power MOS-FET.

6. An apparatus according to claim 1, wherein:
   said current switch is a power MOS-FET; and
   said control terminal of the current switch is a gate terminal of the power MOS-FET; and
   said power MOS-FET includes a diode.

7. An apparatus according to claim 1, further comprising:
   the device connected to the first terminal of the current switch.

8. An apparatus according to claim 1, wherein:
   said first and second battery pack terminals are the only terminals for passing current to and receiving current from the battery.

9. An apparatus comprising:
    a battery including first and second terminals;
    a current switch including:
        a first terminal connected to the first terminal of the battery,
        a second terminal for supplying power to a device, and
        a control terminal which controls a state of the current switch,
        said current switch transmitting current between the first terminal and the second terminal in order for the battery to be discharged only when a conducting signal is applied to said control terminal of said current switch;
    a battery pack housing which includes therein the battery;
    a first battery pack terminal, connected to the second terminal of the current switch, exposed to an exterior of the battery pack housing;
    a second battery pack terminal, connected to the second terminal of the battery, exposed to the exterior of the battery pack housing; and
    a third battery pack terminal mounted on an exterior of the battery pack housing and connected to the control terminal of the current switch,
    wherein the first battery pack terminal and the second battery pack terminal are both for supplying current to a device external to the battery pack housing from the battery and also for charging the battery,
    the apparatus further comprising;
    a diode connected across the first terminal and the second terminal of the current switch which allows current to flow between the first terminal and the second terminal in order to charge the battery pack regardless of the state of the switch,
    wherein during a normal operation said conducting signal is supplied from the device through the third battery pack terminal to the control terminal of the current switch when the battery pack housing is installed, and said conducting signal is not supplied to the control terminal and the current switch is not activated when the battery pack housing is not installed.

10. An apparatus comprising:
    a battery including first and second terminals;
    a current switch including:
        a first terminal connected to the first terminal of the battery, a second terminal for supplying power to a device, and
a control terminal which controls a state of the current switch,
said current switch transmitting current between the first terminal and the second terminal in order for the battery to be discharged only when a conducting signal is applied to said control terminal of said current switch;
a battery pack housing which includes therein the battery and the current switch;
a first battery pack terminal, connected to the second terminal of the current switch, exposed to an exterior of the battery pack housing; and
a second battery pack terminal, connected to the second terminal of the battery, exposed to the exterior of the battery pack housing,
wherein the first battery pack terminal and the second battery pack terminal are both for supplying current to a device external to the battery pack housing from the battery and also for charging the battery,
the apparatus further comprising:
a diode connected across the first terminal and the second terminal of the current switch which allows current to flow between the first terminal and the second terminal in order to charge the battery pack regardless of the state of the switch,
wherein said battery and current switch comprise a first battery system, said apparatus further comprising:
a second battery system including:
a second battery; and
a second current switch including:
a first terminal connected to a terminal of the second battery,
second terminal for supplying power to the device, and
a control terminal which controls a state of the second current switch and,
said second current switch transmitting current between the first terminal and the second terminal thereof in order for the second battery to be discharged only when a second conducting signal is applied to said control terminal of said second current switch;
a microprocessor disposed in said device, connected to the control terminals of the first and second current switches, for generating the control signals applied to the control terminals of the current switches of the battery systems.

11. An apparatus comprising:
a battery including first and second terminals;
a current switch including;
a first terminal connected to the first terminal of the battery,
a second terminal for supplying power to a device, and
a control terminal which controls a state of the current switch,
said current switch transmitting current between the first terminal and the second terminal in order for the battery to be discharged only when a conducting signal is applied to said control terminal of said current switch;
a battery pack housing which includes therein the battery and the current switch;
a first battery pack terminal, connected to the second terminal of the current switch, exposed to an exterior of the battery pack housing; and a second battery pack terminal, connected to the second terminal of the battery, exposed to the exterior of the battery pack housing,
wherein the first battery pack terminal and the second battery pack terminal are both for supplying current to a device external to the battery pack housing from the battery and also for charging the battery,
the apparatus further comprising:
a diode connected across the first terminal and the second terminal of the current switch which allows current to flow between the first terminal and the second terminal in order to charge the battery pack regardless of the state of the switch,
said apparatus further comprising the device connected to the first terminal of the current switch,
wherein said device is a portable computer having at least two components, a first of said components powered by the first battery system and a second of said components powered by the second battery system, wherein the microprocessor independently controls the first and second current switches.

12. A battery pack, comprising:
a battery including first and second terminals;
a control signal supplying means for supplying a control signal indicating that the battery may be discharged; and
switch means including:
a first terminal connected to the first terminal of the battery,
a second terminal for supplying power to a device, and
a control terminal, connected to the control signal supplying means, which controls a state of the switch means,
the switch means for preventing the battery from discharging unless the control signal is applied to the control terminal;
a battery pack housing which includes the battery and the switch means;
a first battery pack terminal, connected to the second terminal of the switch means, exposed to an exterior of the battery pack housing; and
a second battery pack terminal, connected to the second terminal of the battery, exposed to the exterior of the battery pack housing,
the battery pack further comprising:
diode means, connected between the first and second terminals of the switch means, for allowing the battery to be charged regardless of a state of the control signal supplied by the control means,
wherein the control signal supplying means comprises a magnet activated switch means wherein during a normal operation said conducting signal is supplied through the magnet activated switch means to the control terminal when the battery pack housing is installed in a device including a magnet used to activate the magnet activated switch means, and said conducting signal is not supplied to the control terminal when said magnet activated switch means is not activated and the battery pack housing is not installed.

13. A battery sack according to claim 12, wherein the switch means and said diode means are disposed in a power MOS-FET.

14. A battery pack according to claim 12, wherein:
said first and second battery pack terminals are the only terminals for passing current to and receiving current from the battery.

15. A battery pack, comprising:
- a battery including first and second terminals;
- a control signal supplying means for supplying a control signal indicating that the battery may be discharged; and
- switch means including:
  - a first terminal connected to the first terminal of the battery,
  - a second terminal for supplying power to a device, and
  - a control terminal, connected to the control signal supplying means, which controls a state of the switch means,
  - the switch means for preventing the battery from discharging unless the control signal is applied to the control terminal;
- a battery pack housing which includes the battery and the switch means;
- a first battery pack terminal, connected to the second terminal of the switch means, exposed to an exterior of the battery pack housing; and
- a second battery pack terminal, connected to the second terminal of the battery, exposed to the exterior of the battery pack housing, the battery pack further comprising:
- diode means, connected between the first and second terminals of the switch means, for allowing the battery to be charged regardless of a state of the control signal supplied by the control means,
- wherein the control signal supplying means comprises said device, wherein during a normal operation said conducting signal is supplied from the device to the control terminal of the switch means when the battery pack housing is installed, and said conducting signal is not supplied to the control terminal and the switch means is not activated when the battery pack housing is not installed.

* * * * *